US011126590B2

(12) United States Patent
Wang (10) Patent No.: US 11,126,590 B2
(45) Date of Patent: Sep. 21, 2021

(54) DATA PROCESSING METHOD AND DEVICE (71) Applicant: TENCENT TECHNOLOGY (SHENZHEN) COMPANY LIMITED, Shenzhen (CN)

(72) Inventor: Yan Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 1126 days.

(21) Appl. No.: 15/456,637

(22) Filed: Mar. 13, 2017

(65) Prior Publication Data

US 2017/0185615 A1 Jun. 29, 2017

Related U.S. Application Data

(63) Continuation of application No. PCT/CN2016/077911, filed on Mar. 30, 2016.

(30) Foreign Application Priority Data

Apr. 2, 2015 (CN) .......................... 201510155767.6

(51) Int. Cl.
*G06F 16/13* (2019.01)
*G06F 16/182* (2019.01)

(52) U.S. Cl.
CPC ............ *G06F 16/13* (2019.01); *G06F 16/182* (2019.01)

(58) Field of Classification Search
CPC .............................. G06F 16/13; G06F 16/182
See application file for complete search history.

(56) References Cited

U.S. PATENT DOCUMENTS 9,189,332 B1* 11/2015 Moon ................. G06F 11/1068
2003/0188097 A1* 10/2003 Holland .............. G06F 11/1076
711/114

(Continued)

FOREIGN PATENT DOCUMENTS

CN 102142006 A 8/2011
CN 102624866 A 8/2012
(Continued)

OTHER PUBLICATIONS

The World Intellectual Property Organization (WIPO) International Search Report for PCT/CN2016/077911 Jun. 23, 2016 5 Pages.

*Primary Examiner* — Mark D Featherstone
*Assistant Examiner* — Ranjit P Doraiswamy
(74) *Attorney, Agent, or Firm* — Anova Law Group, PLLC (57) ABSTRACT

Embodiments of the present disclosure disclose a data processing method, including: receiving an upload instruction for a target file; obtaining storage location information of the target file in response to the upload instruction; and uploading the target file to a corresponding target first storage device in K first storage devices and M second storage devices according to location information of the K first storage devices and location information of the M second storage devices, so that when determining that a preset condition is satisfied, a target second storage device in the M second storage devices generates M parity blocks according to a file stored in the target second storage device, respectively stores M−1 parity blocks in remaining M−1 second storage devices, deletes the file stored in the target second storage device, and instructs the remaining M−1 second storage devices to delete files stored in the remaining M−1 second storage devices. The embodiments of the present disclosure further disclose a data processing device.

(Continued)

By implementing the embodiments of the present disclosure, network bandwidth overheads caused by cache writing can be effectively reduced.

20 Claims, 4 Drawing Sheets

(56) References Cited

U.S. PATENT DOCUMENTS

2012/0254675 A1   10/2012  Stepanenko
2014/0317056 A1*  10/2014  Kim ................... G06F 16/1827
                                                              707/634

FOREIGN PATENT DOCUMENTS

CN         103631815 A     3/2014
CN         103812899 A     5/2014
EP          2933733 A1 * 10/2015  ............... G06F 3/06

* cited by examiner

DATA PROCESSING METHOD AND DEVICE

RELATED APPLICATION

This application claims priority to PCT Application No. PCT/CN2016/077911 filed on Mar. 30, 2016, which claims priority to Chinese Patent Application No. 201510155767.6, filed with the Chinese Patent Office on Apr. 2, 2015 and entitled "DATA PROCESSING METHOD AND DEVICE", which are incorporated herein by reference in entirety.

FIELD OF THE TECHNOLOGY

The present disclosure relates to the field of Internet technologies, and in particular, to a data processing method and device.

BACKGROUND OF THE DISCLOSURE

In a distributed storage system, data is distributed and stored on multiple independent devices. An extensible system structure is used, storage loads shared by using multiple storage servers, and storage information is located by using a location server, so that system reliability, availability, and access efficiency are improved, and the system is easily extensible.

Currently, all mainstream distributed storage systems provide an erasure code-based storage mode to resolve a problem of data inconsistency brought by erasure codes. A specific implementation of the storage mode is as follows. First, data uploaded by a user is stored in multiple cache devices (such as a cache) in a multi-copy manner, a synchronizing device reads a data copy stored in any one of the cache devices, performs fragmentation and encoding on the data copy, and generates as fragment of parity data. Subsequently, the data-synchronizing device stores a fragment of the data copy and the fragment of the parity data to corresponding storage devices respectively, updates a file index, and deletes data copies stored in the cache devices.

However, in practice, in the distributed storage system implemented in a cache-based manner, an extremely large amount of traffic between devices is caused, and network bandwidth overheads are relatively large.

SUMMARY

Embodiments of the present disclosure disclose a data processing method and device to reduce network bandwidth overheads caused by cache writing.

A first aspect of the embodiments of the present disclosure provides a data processing method, including: receiving an upload instruction for a target file; obtaining storage location information of the target file in response to the upload instruction, the storage location information including location information of K first storage devices configured to store original data, and location information of M second storage devices configured to store parity blocks. $K \geq 2$, $M \geq 2$, and K and M being integers; and uploading the target file to a corresponding target first storage device in the K first storage devices and the M second storage devices according to the location information of the K first storage devices and the location information of the M second storage devices, so that when determining that a preset condition is satisfied, a target second storage device in the M second storage devices generates M parity blocks according to a file stored in the target second storage device, respectively stores M−1 parity blocks in remaining M−1 second storage devices, deletes the file stored in the target second storage device, and instructs the remaining M−1 second storage devices to delete files stored in the remaining M−1 second storage devices.

A second aspect of the embodiments of the present disclosure provides a data processing device, including: a receiving module, configured to receive an upload instruction for a target file; an obtaining module, configured to obtain storage location information of the target file in response to die upload instruction, the storage location info nation including location information of K first storage devices configured to store original data, and location information of M second storage devices configured to store parity blocks, $K \geq 2$, $M \geq 2$, and K and M being integers; and a processing module, configured to upload the target file to a corresponding target first storage device in the K first storage devices and the M second storage devices according to the location information of the K first storage devices and the location information of the M second storage devices, so that when determining that a preset condition is satisfied, a target second storage device in the M second storage devices generates M parity blocks according to a file stored in the target second storage device, respectively stores M−1 parity blocks in remaining M−1 second storage devices, deletes the file stored in the target second storage device, and instructs the remaining M−1 second storage devices to delete files stored in the remaining M−1 second storage devices.

Implementation of the embodiments of the present disclosure has the following beneficial effects. When an upload instruction for a target file is received, storage location information of the target file may be obtained in response to the upload instruction, the storage location information may include location information of K first storage devices configured to store original data, and location information of M second storage devices configured to store parity blocks, and the target file is uploaded to a corresponding target first storage device in the K first storage devices and the M second storage devices, so that when determining that a preset condition is satisfied, a target second storage device in the M second storage devices generates M parity blocks according to a file stored in the target second storage device, respectively stores M−1 parity blocks in remaining M−1 second storage devices, deletes the file stored in the target second storage device, and instructs the remaining M−1 second storage devices to delete files stored in the remaining M−1 second storage devices. Because data does not need to be cached by using a cache device in a data uploading and storing process, network bandwidth overheads caused by cache writing can be effectively reduced.

BRIEF DESCRIPTION OF THE DRAWINGS

To describe the technical solutions in the embodiments of the present disclosure more dearly, the following briefly introduces the accompanying drawings required for describing the embodiments or the existing technology. Apparently, the accompanying drawings in the following descriptions show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

The embodiments of the present disclosure provide a data processing method and device, to effectively reduce network bandwidth overheads caused by cache writing. Detailed descriptions are made below separately.

Figure 1:
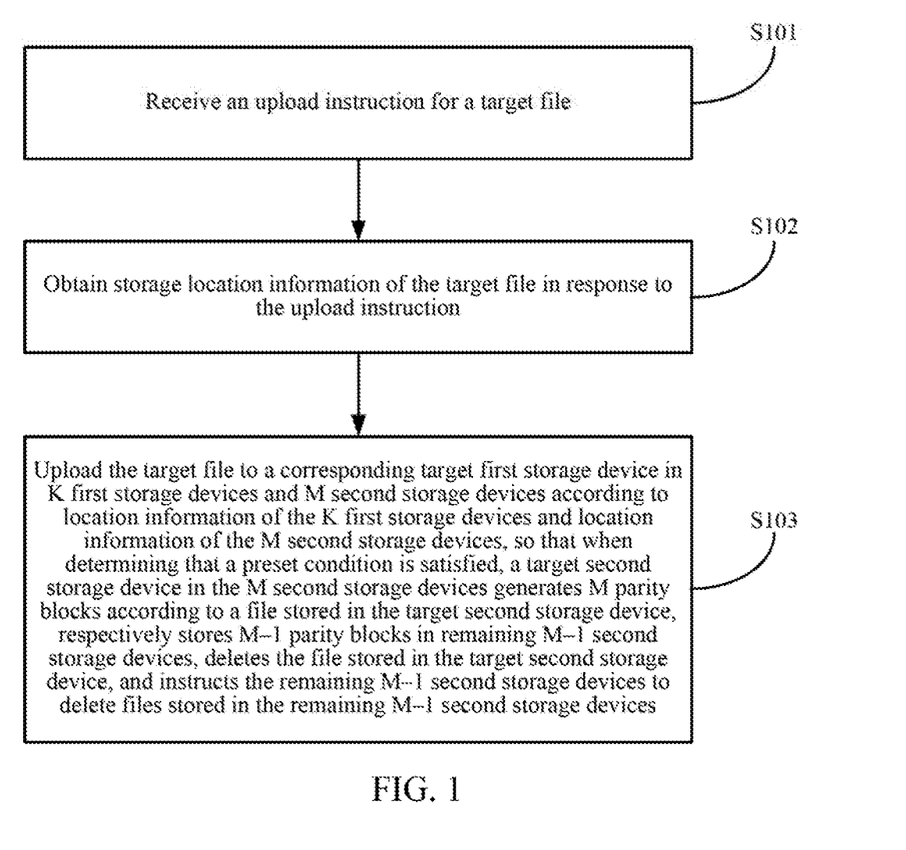
FIG. 1 is a schematic flowchart of a data processing method according to an embodiment of the present disclosure.

Referring to FIG. 1, FIG. 1 is a schematic flowchart of a data processing method according to an embodiment of the present disclosure. As shown in FIG. 1, the data processing method may include the following steps.

S101: Receive an upload instruction for a target file.

In this embodiment of the present disclosure, the method may be applied to a client, and the client may include but is not limited to a personal computer (PC), a mobile phone, and a tablet computer. The client tray access a system by using a specific process, to perform a data processing operation such as file uploading, downloading, or deleting.

In this embodiment of the present disclosure, when a user needs to upload a file, the user may send an instruction for uploading the file. For example, the user may select, in a designated function screen (such as a file upload screen) of the client, a file (a target file) that needs to be uploaded, and send an upload instruction for the target file to the client by clicking a designated function button (such as an "upload" button) in the designated function screen. The target file may include one or more files, and the file may include but is not limited to data content such as a picture or a document.

S102: Obtain storage location information of the target file in response to the upload instruction.

In this embodiment of the present disclosure, when receiving the upload instruction input by the user for the target file, the client needs to determine location information of a storage device that stores the target file.

In an optional implementation, in step S102, the obtaining storage location information of the target file may include the following steps.

11) Send an upload request for the target file to a central metadata cluster, so that the central metadata cluster determines the storage location information of the target file according to the upload request.

12) Receive the storage location information of the target file returned by the central metadata cluster.

In this optional implementation, a data processing system may include at least the following parts: a central metadata cluster, responsible for data locating and routing information; a data cluster, including a storage device for storing original data and a storage device for storing a parity block; and a client, configured to: receive an operation request of a user for a file (such as file uploading, downloading, or deleting), and convert the request to an intra-cluster interaction protocol.

Specifically, when the client receives an upload instruction for a target file, the client may send an upload request for the target file to the central metadata cluster; and after receiving the upload request, the central metadata cluster may determine storage location information of the target file according to identification information of the target file or another preset rule, that is, determine, in the data cluster, a storage device configured to store the target file, and send the storage location information of the target file to the client.

In another optional implementation, in step S102, the obtaining storage location information of the target file may include the following steps: (21) Obtain identification information of the target file included in the upload instruction. (22) Determine the storage location information of the target file according to the identification information.

In this optional implementation, different from the previous optional implementation, a data upload system does not include the central metadata cluster, and when the client receives the upload instruction for the target file, the client determines the storage location information of the target file.

Specifically, when the client receives the upload instruction for the target file, the client may obtain identification information of the target file carried in the upload instruction, for example, a file name of the target file, and determine, according to the identification information of the target file, location information of a storage device that is configured to store the target file.

In this embodiment of the present disclosure, the storage location information of the target file may include location information of K storage devices (first storage devices) configured to store original data, and location information of M storage devices (second storage devices) configured to store parity blocks, $K \geq 2$, $M \geq 2$, and K and M are integers. Specific values of K and M may be determined according to an actual application scenario, for example, K=4, and M=2.

S103: Upload the target file to a corresponding target first storage device in K first storage devices and M second storage devices according to location information of the K first storage devices and location information of the M second storage devices, so that when determining that a preset condition is satisfied, a target second storage device in the M second storage devices generates M parity blocks according to a file stored in the target second storage device, respectively stores M−1 parity blocks in remaining second storage devices, deletes the file stored in the target second storage device, and instructs the remaining M−1 second storage devices to delete files stored in the remaining M−1 second storage devices.

In this embodiment of the present disclosure, after the client obtains the storage location information of the target file, on one hand, the client needs to upload the target file to the corresponding target first storage device in the K first storage devices, and on the other hand, the client needs to separately store the target file to the M second storage devices (that is, all the M second storage devices need to ore the target file).

Specifically, after the client obtains the storage location information of the target file, on one hand, the client may determine the target first storage device according to a preset rule. For example, the client may determine the corresponding target first storage device according to a file name of the target file. After the client determines the target first storage device, the client may upload the target file to the target first storage device. On the other hand, the client further needs to upload the target file to the M second storage devices.

It should be noted that in this embodiment of the present disclosure, if the target file includes multiple files, the target first storage device may be multiple first storage devices (that is, multiple target first storage devices) in the K first storage devices, and the multiple target first storage devices respectively store one or more of the target files (for the target file, files stored in the target first storage devices are different). In addition, if the target file includes multiple files, all the M second storage devices need to store the multiple files.

In this embodiment of the present disclosure, for the M second storage devices, the central metal to cluster (if it exists) or the client may determine a target second storage device in the M second storage devices, or the M second storage devices determine the target second storage device according to a preset rule. After the cheat uploads the target file to the M second storage devices, when determining that a preset condition is satisfied, the target second storage device in the M second storage devices may generate M parity blocks according to a file stored in the target second storage device, respectively store M−1 parity blocks in remaining M−1 second storage devices, delete the file stored in the target second storage device, and instruct the remaining M−1 second storage devices to delete files stored in the remaining M−1 second storage devices.

In this embodiment of the present disclosure, that the target second storage device determines that a preset condition is satisfied may include but is not limited to: the target second storage device determines that a quantity of the target files stored in the target second storage device reaches a preset quantity threshold, or the target second storage device determines that a time period that has elapsed since generation of a parity block last time reaches a preset time threshold.

Specifically, in this embodiment of the present disclosure, a time threshold and a quantity threshold that are used to trigger the target second storage device to generate the parity block may be preset. When the target second storage device starts to operate, a timer may be started, and timeout duration of the timer is the preset time threshold. Before the timer times out, if a quantity of files received and stored by the target second storage device reaches the preset quantity threshold, the target second storage device may generate the parity block according to the files stored in the target second storage device, and set a timing time of the timer to 0, to restart timing; or before the timer times out, if a quantity of files received and stored by the target second storage device does not reach the preset quantity threshold, the target second storage device may generate, when the timer times out, the parity block according to the files stored in the target second storage device, and set a timing time of the timer to 0, to restart timing.

In this embodiment of the present disclosure, the target second storage device may generate the parity block according to an erasure code rule or another rule. The files (that is, the files stored in the M second storage devices) used by the target second storage device to generate the parity block may be the target file, or files that include the target file that are uploaded by a same client for multiple times, or files that include the target file and that are respectively uploaded by different clients. The files stored in the second storage devices described in this embodiment of the present disclosure do not include the parity blocks stored in the second storage devices.

In this embodiment of the present disclosure, after the target second storage device generates M parity blocks according to a file stored in the target second storage device, the target second storage device may respectively store M−1 parity blocks to M−1 second storage devices, delete a file stored in the target second storage device, and instruct remaining M−1 second storage devices to delete files stored in the remaining M−1 second storage devices.

It can be seen that in the procedure of the method described in FIG. 1, a client directly uploads, to a storage device, a target file that needs to be uploaded. The storage device includes at least two first storage devices configured to store original data, and at least two second storage devices configured to store parity blocks. A target second storage device in the second storage devices that store the parity blocks generates parity blocks according to a file stored in the target second storage device, and separately stores the parity blocks locally and to remaining second storage devices. In a data uploading process, data does not need to be cached by using a cache device, thereby ensuring reliability of data storage, and effectively reducing network bandwidth overheads caused by cache writing.

Figure 2:
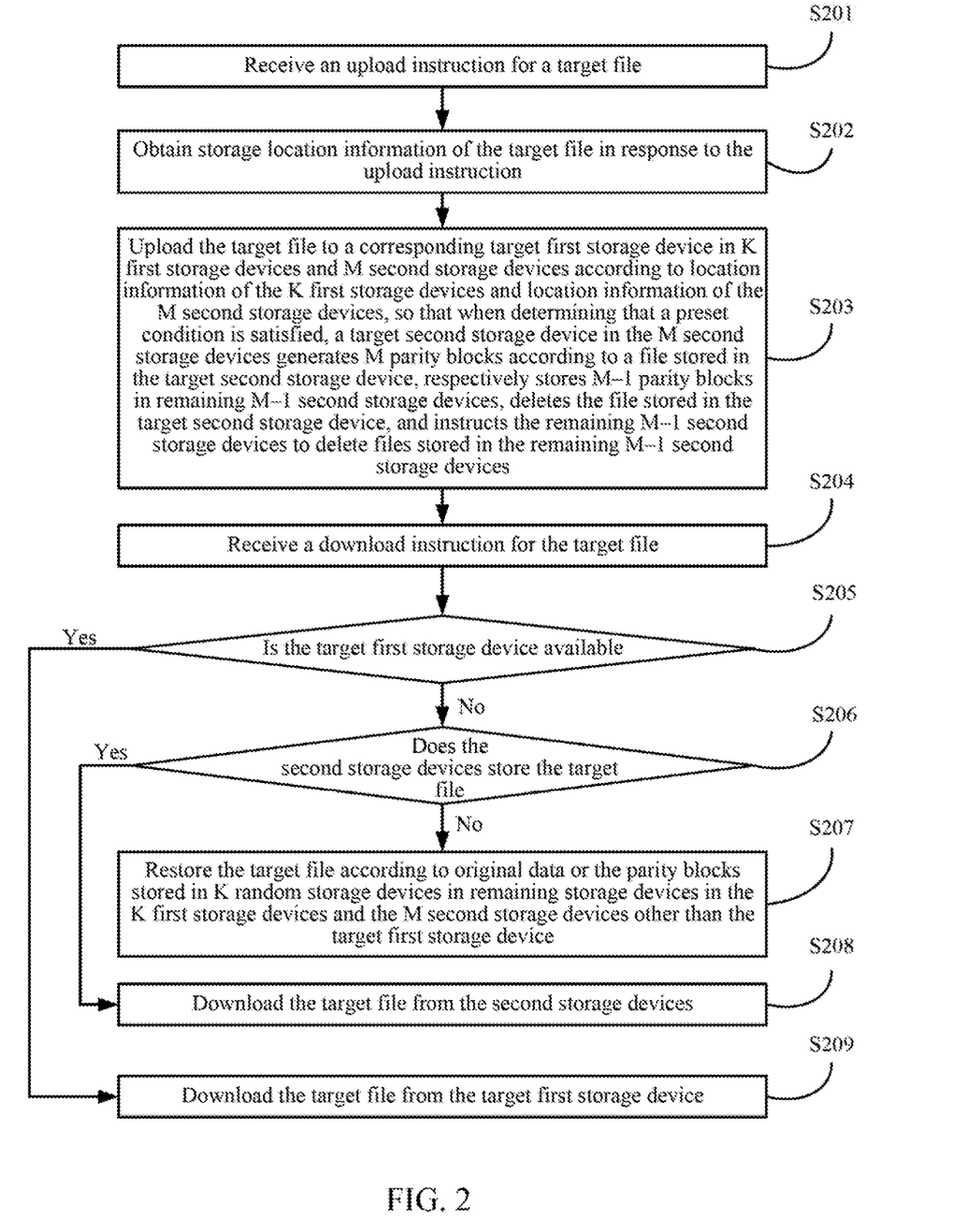
FIG. 2 is a schematic flowchart of another data processing method according to an embodiment of the present disclosure.

Referring to FIG. 2, FIG. 2 is a schematic flowchart of another data processing method according to an embodiment of the present disclosure. As shown in FIG. 2, the data processing method may include the following steps.

S201: Receive an upload instruction for a target file.

S202: Obtain storage location information of the target file in response to the upload instruction.

S203: Upload the target file to a corresponding target first storage device in K first storage devices and M second storage devices according to location information of the K first storage devices and location information of the M second storage devices, so that when determining that a preset condition is satisfied, a target second storage device in the M second storage devices generates M parity blocks according to a file stored in the target second storage device, respectively stores M−1 parity blocks in remaining M−1 second storage devices, deletes the file stored in the target second storage device, and instructs the remaining M−1 second storage devices to delete files stored in the remaining M−1 second storage devices.

In this embodiment of the present disclosure, for a specific implementation of steps S201 to S203, reference may be made to the related descriptions of steps S101 to S103, and details are not described herein again.

S204: Receive a download instruction for the target file.

In this embodiment of the present disclosure, after the target file is uploaded to the storage device, if a user intends to download the target file, the user may send an instruction for downloading the target file to a client. For example, the user may select the target file in a designated function screen (such as a file download screen) of the client, and send the download instruction for the target file to the client by clicking a designated function button (such as a "download" button) in the designated function screen.

S205: Determine whether the target first storage device is available. If it is determined that the target first storage device is available, go to step S209; otherwise, go to step S206.

In this embodiment of the present disclosure, the storage device configured to store the target file includes the target first storage device configured to store original data of the target file and the second storage devices the second storage devices may store original data (generation of parity blocks is not completed) of the target file, or parity blocks corresponding to the target file) configured to store the parity blocks corresponding to the target file. Therefore, when the client receives the download instruction for the target file, the client may preferentially choose to directly download the target file from the target first storage device.

Correspondingly, when the client receives the download instruction Input by the user for the target file, the client may first determine a location of the target first storage device, and determine whether the target first storage device is available.

In an optional implementation, when a data processing system includes a central metadata cluster, the client may query the storage location information of the target file in the central metadata cluster, and the central metadata cluster determines whether the target first storage device is available.

In this optional implementation, for a specific implementation of determining, by the central metadata cluster, the storage location information of the target file, reference may be made to the related descriptions of the procedure of the method described in FIG. 1, and the central metadata cluster may monitor an available status of a data cluster (a storage device) by using a heartbeat message.

In another optional implementation, when a data processing system does not include a central metadata cluster, and the client receives the download instruction for the target file, the client may determine the storage location information of the target file, and determine whether the target first storage device is available.

In this optional implementation, for a specific implementation of determining, by the client, the storage location information of the target file, reference may be made to the related descriptions of the procedure of the method described in FIG. 1, and after determining the target first storage device, the client may determine, by using a heartbeat message or another mechanism, whether the target first storage device is available.

In this embodiment of the present disclosure, when the client determines that the target first storage device is available, step S209 may be performed; or when, the client determines that the target first storage device is not available, steps S206 to S208 may be performed.

S206: Determine whether the second storage devices store the target file. If it is determined that the second storage devices store the target file, go to step S208; otherwise, go to S207.

In this embodiment of the present disclosure, when the client determines that the target first storage device is not available, the client may further determine whether the second storage devices store the target file.

The client may send a query request for the target file to a random second storage device of the M second storage devices, and if the second storage devices store the target file, step S208 is performed; otherwise, step S207 is performed.

S207: Restore the target file according to original data or parity blocks stored in K random storage devices in remaining storage devices in the K first storage devices and the M second storage devices other than the target first storage device.

In this embodiment of the present disclosure, when the target first storage device is not available and the target second storage device does not store the target file (that is, when the second storage devices have already generated the parity blocks corresponding to the target file, and deleted the original data of the target file), the client may restore the target file according to the original data or the parity blocks stored in the K random storage devices in remaining storage devices in the K first storage devices and the M second storage devices other than the target first storage device.

S208: Download the target file from the second storage devices.

In this embodiment of the present disclosure, when the target first storage device is not available and the second storage devices store the target file (that is, the second storage devices have not yet generated the parity blocks corresponding to the target file), the client may download the target file from the second storage devices.

S209: Download the target file from the target first storage device.

In this embodiment of the present disclosure, when the target first storage, device is available, the client may download the target file from the target first storage device.

It should be noted that in an actual application scenario, the client that performs steps S201 to S203 and the client that performs steps S204 to S209 may be different clients, and the target file that is uploaded in steps S201 to S203 and the target file that is downloaded in steps S204 to S209 may be different target files. In this case, there is no necessary chronological relationship between a procedure related to steps S201 to S203 and a procedure related to steps S204 to S209.

As an example, a file A is uploaded and a file B is downloaded. For a specific implementation of uploading the file A, reference may be made to steps S201 to S203 (or steps S101 to S103), and for a specific implementation of downloading the file B, reference may be made to steps S204 to S209. In this case, a related processing operation of uploading the file A may be performed after a related processing operation of downloading the file B, or the two operations are performed simultaneously.

Figure 3:
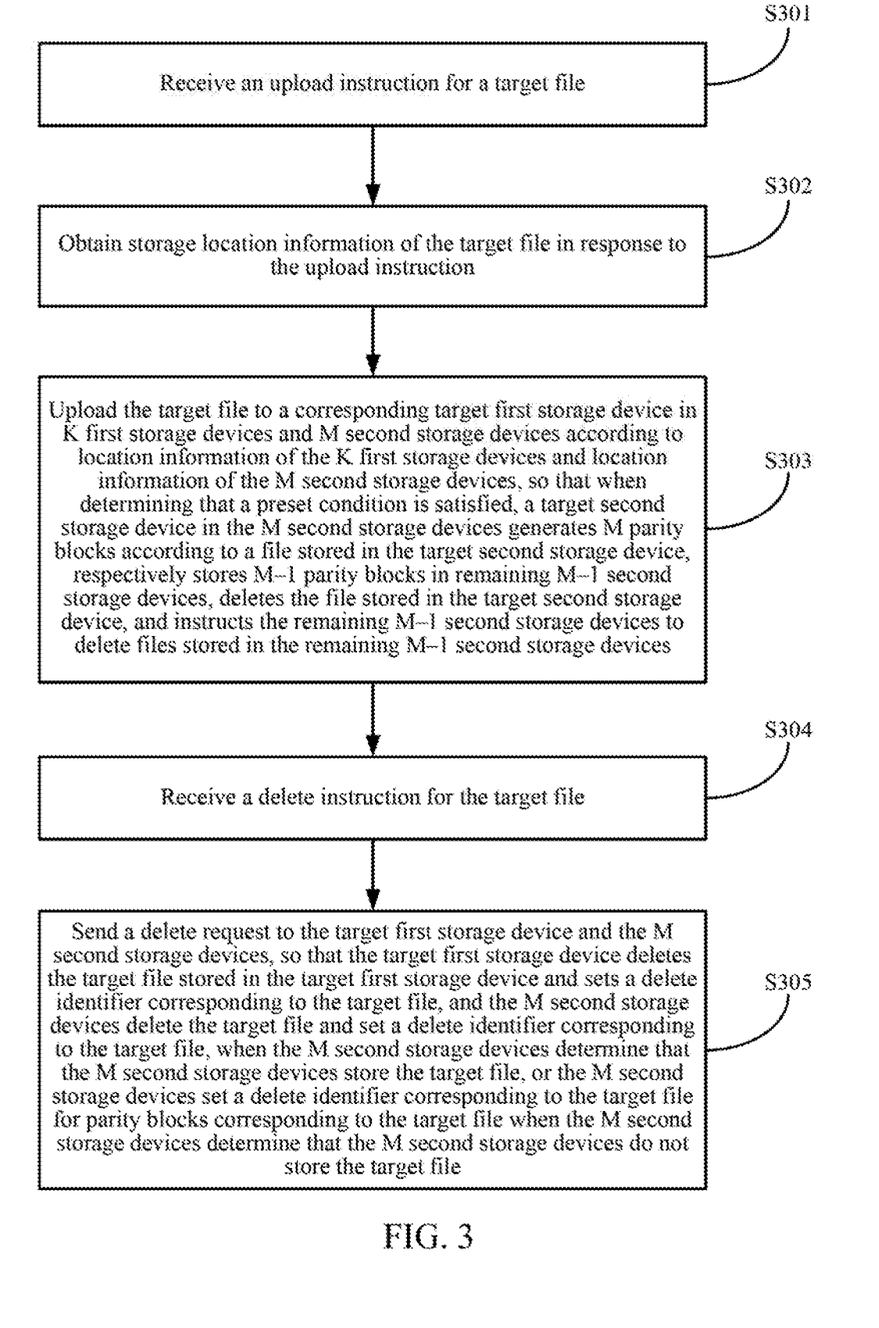
FIG. 3 is a schematic flowchart of another data processing method according to an embodiment of the present disclosure.

Referring to FIG. 3, FIG. 3 is a schematic flowchart of another data processing method according to an embodiment of the present disclosure. As shown in FIG. 3, the data processing method may include the following steps.

S301: Receive an upload instruction for a target file.

S302: Obtain storage location information of the target file in response to the upload instruction.

S303: Upload the target file to a corresponding target first storage device in K first storage devices and M second storage devices according to location information of the K first storage devices and location information of the M second storage devices, so that when determining that a preset condition is satisfied, a target second storage device in the M second storage devices generates M parity blocks according to a file stored in the target second storage device, respectively stores M−1 parity blocks in remaining M−1 second storage devices, deletes the file stored in the target second storage device, and instructs the remaining M−1 second storage devices to delete files stored in the remaining M−1 second storage devices.

In this embodiment of the present disclosure, for a specific implementation of steps S301 to S303, reference may be made to the related descriptions of steps S101 to S103, and details are not described herein again.

S304: Receive a delete instruction for the target file.

In this embodiment of the present disclosure, after the target file is uploaded to the storage device, if a user intends to delete the target file, the user may send an instruction for deleting the target file to a client. For example, the user may select the target file in a designated function screen (such as a file management screen) of the client, and send the delete instruction for the target file to the client by clicking a designated function button (such as a "delete" button) in the designated function screen.

S305: Send a delete request to the target first storage device and the M second storage devices, so that the target first storage device deletes the target file stored in the target first storage device and sets a delete identifier corresponding to the target file, and the M second storage devices delete the target file and set a delete identifier corresponding to the target file, when the M second storage devices determine that the M second storage devices store the target file, or the M second storage devices set a delete identifier corresponding to the target file for parity blocks corresponding to the target file when the M second storage devices determine that the M second storage devices do not store the target file.

In this embodiment of the present disclosure, the storage device configured to store the target file includes the target first storage device configured to store original data of the target file and the second storage devices configured to store the parity blocks corresponding to the target file. Therefore, when the client receives the delete instruction for the target file, the client needs to send the delete request to the target first storage device corresponding to the target file, and the M second storage devices. For a specific implementation method for determining, by the client, the storage location information corresponding to the target file, reference may be made to the related descriptions of the procedure of the method described in FIG. 1, and details are not described herein again.

In this embodiment of the present disclosure, after the file is deleted, a system needs to reclaim storage space, m the storage device, for storing the deleted file. However, considering that overheads of an operation of reclaiming the storage space are relatively large, if each time a file is deleted, the operation of reclaiming storage space is performed, system overheads are increased. Therefore, in the technical solution provided in this embodiment of the present disclosure, when the target first storage device or the second storage devices receive the delete request for the target file, the target first storage device or the second storage devices set a delete identifier corresponding to the target file while deleting the target file. When a quantity of delete identifiers reaches a threshold, or when the system is idle, a corresponding operation of reclaiming storage space is performed.

Specifically, after receiving a delete request sent by the client for the target file, the target first storage device may delete the target file stored in the target first storage device, and set a delete identifier corresponding to the target file. After receiving a delete request sent by the client for the target file, the M second storage devices may first determine whether the M second storage devices store the target file. If the M second storage devices store the target file (that is, corresponding parity blocks have not been generated yet), the M second storage devices may delete the target file stored in the M second storage devices, and set a delete identifier corresponding to the target file; or if the M second storage devices do not store the target file (that is, corresponding parity blocks have been generated), the M second storage devices may set a delete identifier corresponding to the target file for the parity blocks corresponding to the target file.

When the first storage devices encounter a fault and need data recovery, the first storage devices may determine the deleted target file according to the delete identifier stored in the second storage devices, so that the deleted target file may not be recovered.

It should be noted that in an actual application scenario, the client that performs steps S301 to S303 and the client that performs steps S304 and S305 may be different clients, and the target file that is uploaded in steps S301 to S303 and the target file that is deleted in steps S304 and S305 may be different target files. In this case, there is no necessary chronological relationship between a procedure related to steps S301 to S303 and a procedure related to steps S304 and S305.

As an example, a file A is uploaded and a file B is deleted. For a specific implementation of uploading the file A, reference may be made to steps S301 to S303 or steps S101 to S103), and for a specific implementation of deleting the file B, reference, may be made to steps S304 and S305. In this case, a related processing operation of uploading the file A may be performed after a related processing operation of deleting the file B, or the two operations are performed simultaneously.

It may be seen from the foregoing descriptions that in the technical solution provided in this embodiment of the present disclosure, when an upload instruction for a target file is received, storage location information of the target file may be obtained in response to the upload instruction, where the storage location information may include location information of K first storage devices configured to store original data, and location information of M second storage devices configured to store parity blocks, and the target file is uploaded to a corresponding target first storage device in the K first storage devices and the M second storage devices, so that when determining that a preset condition is satisfied, a target second storage device in the M second storage devices generates M parity blocks according to a file stored in the target second storage device, respectively stores M−1 parity blocks in remaining M−1 second storage devices, deletes the file stored in the target second storage device, and instructs the remaining M−1 second storage devices to delete files stored in the remaining M−1 second storage devices. Because data does not need to be cached by using a cache device in a data uploading and storing process, network bandwidth overheads caused by cache writing can be effectively reduced.

The following is apparatus embodiments of the present disclosure. The apparatus embodiments of the present disclosure and the method embodiments of the present disclosure belong to a same concept, and the apparatus embodiments are used to perform the methods described in the method embodiments of the present disclosure. For ease of description, the apparatus embodiments of the present disclosure merely show parts related to the disclosed embodiments of the present disclosure. For specific technical details that are not disclosed, refer to the descriptions of the method embodiments of the present disclosure, and details are not described herein again.

Figure 4:
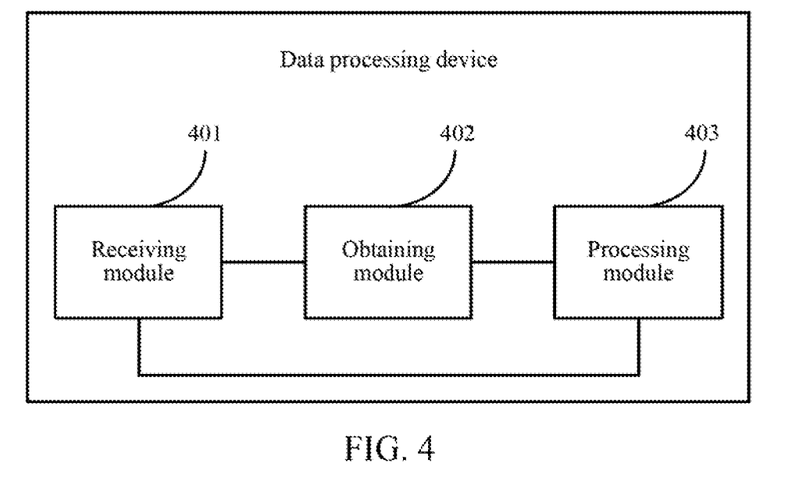
FIG. 4 is a schematic structural diagram of a data processing device according to an embodiment of the present disclosure.

Referring to FIG. 4, FIG. 4 is a schematic structural diagram of a data processing device according to an embodiment of the present disclosure. The data processing device may be applied to the client of the method embodiment. In the present disclosure, a module or a unit may refer to one or more computer programs stored in computer readable media. When executed by a processor, the computer programs implements corresponding functions as described. As shown in FIG. 4, the data processing, device may include: a receiving module 401, configured to receive an upload instruction for a target file; an obtaining module 402, configured to obtain storage location information of the target file in response to the upload instruction, the storage location information including location information of K first storage devices configured to store original data, and location information of M second storage devices configured to store parity blocks, K≥2, M≥2, and K and M being integers; and a processing module 403, configured to upload the target file to a corresponding target first storage device in the K first storage devices and the M second storage devices according to the location information of the K first storage devices and the location information of the M second storage devices, so that when determining that a preset condition is satisfied, a target second storage device in the M second storage devices generates M parity blocks according to a file stored in the target second storage device, respectively stores M−1 parity blocks in remaining M−1 second storage devices, deletes the file stored in the target second storage device, and instructs the remaining M−1 second storage devices to delete, files stored in the remaining M−1 second storage devices.

In an optional embodiment, the obtaining module 402 is specifically configured to: send an upload request for the target file to a central metadata cluster, so that the central metadata cluster determines the storage location information of the target file according to the upload request: and receive the storage location information of the target file returned by the central metadata cluster.

In this optional embodiment, a data processing system may include at least the following parts: a central metadata cluster, responsible for data locating and routing information; a data cluster, including a storage device for storing original data and a storage device for storing a parity block, and a client, configured to: receive an operation request of a user for a file (such as file uploading, downloading, or deleting), and convert the request to an intra-cluster interaction protocol.

Specifically, when the client receives an upload instruction for a target file, the client may send an upload, request for the target file to the central metadata cluster; and after receiving the upload request, the central metadata cluster may determine storage location information of the target file according to identification information of the target file or another preset rule, that is, determine, in the data cluster, a storage device, configured to store the target file, and send the storage location information of the target file to the client.

In another optional embodiment, the obtaining module 402 may be specifically configured to: obtain identification information of the target file included in the upload instruction; and determine the storage location information of the target file according to the identification information.

In this optional implementation, a data upload system does not include the central metadata cluster, and when the client receives the upload instruction for the target file, the client determines the storage location information of the target file.

Specifically, when the client receives the upload instruction for the target file, the client may obtain identification information of the target file carried in the upload instruction, for example, a file name of the target file, and determine, according to the identification information of the target file, location information of a storage device that is configured to store the target file.

In an optional embodiment, the receiving module 401 may further be configured to receive a download instruction for the target file.

The processing module 403 may further be configured to: download the target file from the target first storage device when the target first storage device is available; download the target file from the second storage devices when the target first storage device is not available and the second storage devices store the target file; or restore the target file according to original data or parity blocks stored in K random storage devices in remaining storage devices in the K first storage devices and the M second storage devices other than the target, first storage device, when the target first storage device is not available and the second storage devices do not store the target file.

In an optional embodiment, the receiving module 401 may further be configured to receive a delete instruction for the target file.

Correspondingly, the processing module 403 may further be configured to: send a delete request to the target first storage device and the M second storage devices, so that the target first storage device deletes the target file stored in the target first storage device and sets a delete identifier corresponding to the target file, and the M second storage devices delete the target file and set a delete identifier corresponding to the target file, when the M second storage devices determine that the M second storage devices store the target file, or the M second storage devices set a delete identifier corresponding to the target file for parity blocks corresponding to the target file when the M second storage devices determine that the M second storage devices do not store the target file.

Figure 5:
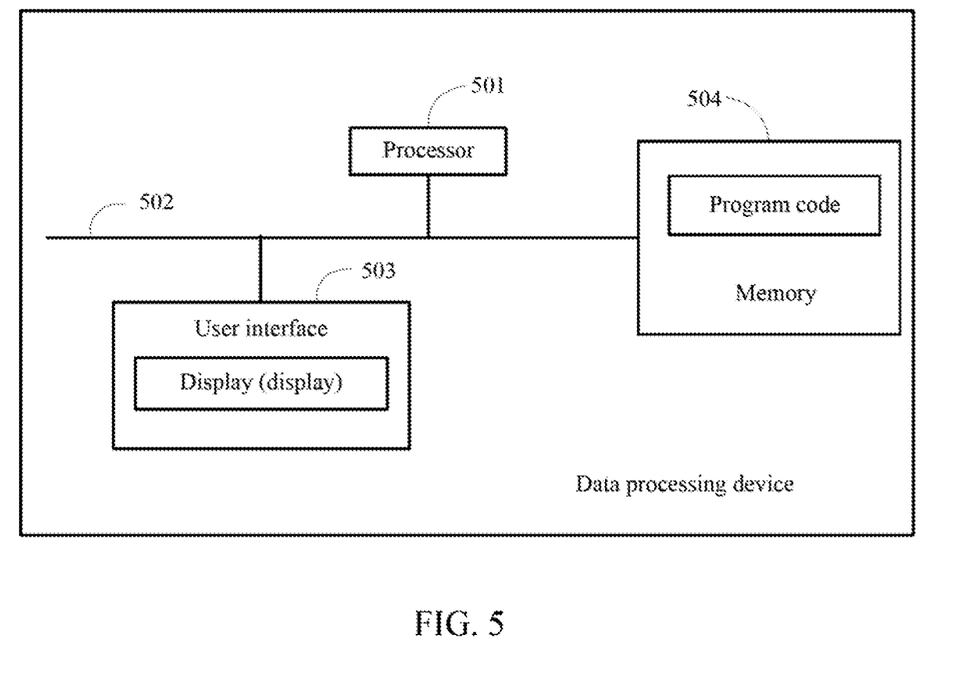
FIG. 5 is a schematic structural diagram of another data processing device according to an embodiment of the present disclosure.

Referring to FIG. 5, FIG. 5 is a schematic structural, diagram of another data processing device according to an embodiment of the present disclosure. As show in FIG. 5, the data processing device may include: at least one processor 501, for example, a CPU, a user interface 503, a memory 504, and at least one communications bus 502. The communications bus 502 is configured to implement connection and communication between the components. The user interface 503 may include a display (Display), and optionally, the user interface 503 may further include a standard wired interface and wireless interface. The memory 504 may be a high-speed RAM memory, or may be a iron-volatile memory (non-volatile memory), such as at least one magnetic disk memory. Optionally, the memory 504 may further be at least one storage apparatus located far away from the processor 501. The memory 504 stores a set of program code, and the processor 501 invokes the program code stored in the memory 504 to perform the following operations: receiving an upload instruction for a target file; obtaining storage location information of the target file in response to the upload instruction, the storage location information including location information of K first storage devices configured to store original data, and location information of M second storage devices configured to store parity blocks, K≥2, M≥2, and K and M being integers; and uploading the target file to a corresponding target first storage device in the K first storage devices and the M second storage devices according to the location information of the K first storage devices and the location information of the M second storage devices, so that when determining that a preset condition is satisfied, a target second storage device in the M second storage devices generates M parity blocks according to a file stored in the target second storage device, respectively stores M−1 parity blocks in remaining M−1 second storage devices, deletes the file stored in the target second storage device, and instructs the remaining M−1 second storage devices to delete files stored in the remaining M−1 second storage devices.

In an optional embodiment, that the processor 501 invokes the program code stored in the memory 504 to obtain the storage location formation of the target file may specifically include: sending an upload request for the target file to a central metadata cluster, so that the central metadata cluster determines the storage location information of the target file according to the upload request; and receiving the storage location information of the target file returned by the central metadata cluster.

In an optional embodiment, that the processor 501 invokes the program code stored in the memory 504 to obtain the storage location information of the target file may specifically include: obtaining identification information of the target file included in the upload instruction; and determining the storage location information of the target file according to the identification information.

In an optional embodiment, after the processor 501 invokes the program code stored in the memory 504 to upload the target file to the corresponding target first storage device in the K first storage devices and the M second storage devices, the processor 501 may further perform the following operations: receiving a download instruction for the target file; downloading the target file from the target first storage device when the target first storage device is available; downloading the target file from the second storage devices when the target first storage device is not available and the second storage devices store the target file; or restoring the target file according to original data or parity blocks stored in K random storage devices in remaining storage devices in the K first storage devices and the M second storage devices other than the target first storage device, when the target first storage device is not available and the second storage devices do not store the target file.

In an optional embodiment, after the processor 501 invokes the program code stored in the memory 504 to upload the target file to the corresponding target first storage device in the K first storage devices and the M second storage devices, the processor 501 may further perform the following operations.

The method further includes: receiving a delete instruction for the target file; and sending a delete request to the target first storage device and the M second storage devices, so that the target first storage device deletes the target file stored in the target first storage device and sets a delete identifier corresponding to the target file, and the M second storage devices delete the target file and set a delete identifier corresponding to the target file, when the M second storage devices determine that the M second storage devices store the target file, or the M second storage devices set a delete identifier corresponding to the target file for parity blocks corresponding to the target file when the M second storage devices determine that the M second storage devices do not store the target file.

In the descriptions of this specification, a description of a reference term such as "an embodiment", "some embodiments", "an example", "a specific example", or "some examples" refer to that a specific characteristic, structure, material, or feature described with reference to the embodiment or the example is included in at least one embodiment or example of the present disclosure. In this specification, exemplary descriptions of the foregoing terms are not necessarily for a same embodiment or example. Moreover, the described specific characteristic, structure, material, or feature may be combined in an appropriate form in any one or more embodiments or examples. In addition, with no conflict, a person skilled in the art may integrate and combine different embodiments or examples and characteristics of the different embodiments or examples described in this specification.

A person skilled in the art may integrate and combine the different embodiments and the characteristics of the different embodiments described in this specification. The modules or units in all the embodiments of the present disclosure may be implemented by using a universal integrated circuit, such as a central processing unit (CPU), or an application-specific integrated circuit (ASIC).

The steps of the methods of all the embodiments of the present disclosure may be reordered, combined, or deleted according to an actual requirement; and the modules or the units of the apparatuses of all the embodiments of the present disclosure may be combined, divided, or deleted according to an actual requirement.

A description of any process or method in the flowcharts or described herein in another manner can be construed as one or more modules, fragments, or parts that include executable instructions used to implement a specific logical function or steps of a process. In addition, the scope of a preferred implementation of the present disclosure includes embodiments, where functions can be performed not in an order shown or discussed, including performing the functions at the same time or in reverse order according to the functions involved. This should be understood by a person skilled in the art of the subject matter of the present disclosure.

The logic and/or steps represented in the flowcharts or described herein in another manner, for example, may be considered as a program list of the executable instructions used to implement the logical function, and may be specifically implemented in any computer-readable medium, to be used by an instruction execution system, apparatus, or device (for example, a computer-based system, a system including a processor, or another system that can obtain an instruction from the instruction execution system, apparatus, or device and execute the instruction), or to be used in combination with the instruction execution system, apparatus, or device. In the context of this specification, a "computer-readable medium" may be any apparatus that can include, store, communicate, propagate, or transmit a program for use by the instruction execution system, apparatus, or device or in combination with the instruction execution system, apparatus, or device. A more specific example of the computer-readable medium includes the following; an electrical connection part (an electronic apparatus) having one or more wires, a portable computer diskette (a magnetic apparatus), a random access memory (RAM), a read-only memory (ROM), an erasable programmable read-only memory (an EPROM or a flash memory), an optical fiber apparatus, and a portable compact disc read-only memory (CDROM). In addition, the computer-readable medium may even be paper or another suitable medium on which the program may be printed, because the program can be electrically captured, by means of for example, optical scanning of the paper or another medium, then complied, interpreted, or otherwise processed in a suitable manner if necessary, and then stored in a computer memory.

A person of ordinary skill in the art may understand that all or some steps of the method of the embodiments may be implemented by one or more programs instructing relevant hardware. The programs may be stored in a computer readable storage medium. When the program is run, one or a combination of the steps of the method embodiments may be performed.

In addition, functional units according to the embodiments of the present disclosure may be integrated in one processing module or exist as separate physical units, or two or more units are integrated in one module. The integrated module may be implemented in the form of hardware or software functional modules. If implemented in the form of software functional modules and sold or used as an independent product, the integrated modules may also be stored in a computer-readable storage medium.

The aforementioned storage medium may be a read-only memory, a magnetic disk, an optical disc, or the like. Although the embodiments of the present disclosure are shown and described above, it may be understood that the foregoing embodiments are exemplary, and should not be construed as limitations to the present disclosure. A person of ordinary skill in the art may make changes, modifications, replacements, and variations to the foregoing embodiments within the scope of the present disclosure.

The foregoing descriptions are merely preferred embodiments of the present disclosure, and are not intended to limit the scope of the present disclosure. A person of ordinary skill in the art may understand or some processes of the foregoing embodiments and equivalent modifications made according to the claims of the present disclosure shall still fall within the scope of the present disclosure.

What is claimed is:

1. A data processing method, comprising:
    receiving an upload instruction for a target file;
    obtaining storage location information of the target file in response to the upload instruction, the storage location information comprising location information of K first storage devices configured to store original data, and location information of M second storage devices configured to store parity blocks, K≥2, M≥2, and K and M being integers; and
    uploading the target file to target first storage devices in the K first storage devices and the M second storage devices according to the location information of the K first storage devices and the location information of the M second storage devices, the target first storage devices respectively storing a different part of the target file, and the M second storage devices each storing the entire target file, so that when determining that a preset condition is satisfied, a target second storage device in the M second storage devices generates M parity blocks according to the entire target file stored in the target second storage device, respectively stores M−1 parity blocks in remaining M−1 second storage devices, deletes the target file stored in the target second storage device, and instructs the remaining M−1 second storage devices to respectively delete the entire target file stored in the remaining M−1 second storage devices so that the M second storage devices each stores one of the M parity blocks while the target first storage devices respectively stores a different part of the target file.

2. The method according to claim 1, the obtaining storage location information of the target file comprising:
    sending an upload request for the target file to a central metadata cluster, so that the central metadata cluster determines the storage location information of the target file according to the upload request; and
    receiving the storage location information of the target file returned by the central metadata cluster.

3. The method according to claim 1, the obtaining storage location information of the target file comprising:
    obtaining identification information of the target file comprised in the upload instruction; and
    determining the storage location information of the target file according to the identification information.

4. The method according to claim 1, after the uploading the target file to target first storage devices in the K first storage devices and the M second storage devices, the method further comprising:
    receiving a download instruction for the target file;
    downloading the target file from the target first storage devices when the target first storage devices are available;
    downloading the target file from the second storage devices when the target first storage device is not available and the second storage devices store the target file; or
    restoring the target file according to original data or, parity blocks stored in K random storage devices in remaining storage devices in the K first storage devices and the M second storage devices other than the target first storage device, when the target first storage device is not available and the second storage devices do not store the target file.

5. The method according to claim 1, after the uploading the target file to a corresponding target first storage device in the K first storage devices and the M second storage devices, the method further comprising:
    receiving a delete instruction for the target file; and
    sending a delete request to the target first storage devices and the M second storage devices, so that the target first storage devices delete the target file stored in the target first storage devices and set a delete identifier corresponding to the target file, and the M second storage devices delete the target file and set a delete identifier corresponding to the target file, when the M second storage devices determine that the M second storage devices store the target file, or the M second storage devices set a delete identifier corresponding to the target file for parity blocks corresponding to the target file when the M second storage devices determine that the M second storage devices do not store the target file.

6. A data processing device, comprising:
    a memory storing computer instructions;
    and a processor, when executing the computer instructions, the processor being configured to:
    receive an upload instruction for a target file;
    obtain storage location information of the target file in response to the upload instruction, the storage location information comprising location information of K first storage devices configured to store original data, and location information of M second storage devices configured to store parity blocks, K≥2, M≥2, and K and M being integers;
    upload the target file to a corresponding target first storage device in the K first storage devices and the M second storage devices according to the location information of the K first storage devices and the location information of the M second storage devices, the target first storage devices respectively storing a different part of the target file, and the M second storage devices each storing the entire target file, so that when determining that a preset condition is satisfied, a target second storage device in the M second storage devices generates M parity blocks according to the entire target file stored in the target second storage device, respectively stores M−1 parity blocks in remaining M−1 second storage devices, deletes the target file stored in the target second storage device, and instructs the remaining M−1 second storage devices to respectively delete the entire target file stored in the remaining M−1 second storage devices so that the M second storage devices each stores one of the M parity blocks while the target first storage devices respectively stores a different part of the target file.

7. The device according to claim 6, wherein the processor is further configured to: send an upload request for the target file to a central metadata cluster, so that the central metadata cluster determines the storage location information of the target file according to the upload request; and receive the storage location information of the target file returned by the central metadata cluster.

8. The device according to claim 6, wherein the processor is further configured to: obtain identification information of the target file comprised in the upload instruction; and determine the storage location information of the target file according to the identification information.

9. The device according to claim 6, wherein the processor is further configured to:

receive a download instruction for the target file; and download the target file from the target first storage devices when the target first storage devices are available; download the target file from the second storage devices when the target first storage device is not available and the second storage devices store the target file; or restore the target file according to original data or parity blocks stored in K random storage devices in remaining storage devices in the K first storage devices and the M second storage devices other than the target first storage device, when the target first storage device is not available and the second storage devices do not store the target file.

10. The device according to claim 6, wherein the processor is further configured to:

receive a delete instruction for the target file;

and send a delete request to the target first storage device and the M second storage devices, so that the target first storage devices delete the target file stored in the target first storage devices and set a delete identifier corresponding to the target file, and the M second storage devices delete the target file and set a delete identifier corresponding to the target file when the M second storage devices determine that the M second storage devices store the target file, or the M second storage devices set a delete identifier corresponding to the target file for parity blocks corresponding to the target file when the M second storage devices determine that the M second storage devices do not store the target file.

11. A non-transitory computer readable medium containing program instructions for data processing, wherein execution of the program instructions by one or more processors of a computer system causes the one or more processors to perform:

receiving an upload instruction for a target file;

obtaining storage location information of the target file in response to the upload instruction, the storage location information comprising location information of K first storage devices configured to store original data, and location information of M second storage devices configured to store parity blocks, and K and M being integers; and uploading the target file to a corresponding target first storage device in the K first storage devices and the M second storage devices according to the location information of the K first storage devices and the location information of the M second storage devices, the target first storage devices respectively storing a different part of the target file, and the M second storage devices each storing the entire target file, so that when determining that a preset condition is satisfied, a target second storage device in the M second storage devices generates M parity blocks according to the entire target file stored in the target second storage device, respectively stores M-1 parity blocks in remaining M-1 second storage devices, deletes the target file stored in the target second storage device, and instructs the remaining M-1 second storage devices to respectively delete the entire target file stored in the remaining M-1 second storage devices so that the M second storage devices each stores one of the M parity blocks while the target first storage devices respectively stores a different part of the target file.

12. The computer readable medium according to claim 11, the obtaining storage location information of the target file comprising:

sending an upload request for the target file to a central metadata cluster, so that the central metadata cluster determines the storage location information of the target file according to the upload request; and receiving the storage location information of the target file returned by the central metadata cluster.

13. The computer readable medium according to claim 11, the obtaining storage location information of the target file comprising:

obtaining identification information of the target file comprised in the upload instruction; and determining the storage location information of the target file according to the identification information.

14. The computer readable medium according to claim 11, after the uploading the target file to target first storage devices in the K first storage devices and the M second storage devices, the program instructions further causing the one or more processors to perform:

receiving a download instruction for the target file;

downloading the target file from the target first storage devices when the target first storage devices are available;

downloading the target file from the second storage devices when the target first storage device is not available and the second storage devices store the target file; or restoring the target file according to original data or parity blocks stored in K random storage devices in remaining storage devices in the K first storage devices and the M second storage devices other than the target first storage device, when the target first storage device is not available and the second storage devices do not store the target file.

15. The computer readable medium according to claim 11, after the uploading the target file to a corresponding target first storage device in the K first storage devices and the M second storage devices, the program instructions further causing the one or more processors to perform:

receiving a delete instruction for the target file; and sending a delete request to the target first storage device and the M second storage devices, so that the target first storage devices delete the target file stored in the target first storage devices and set a delete identifier corresponding to the target file, and the M second storage devices delete the target file and set a delete identifier corresponding to the target file, when the M second storage devices determine that the M second storage devices store the target file, or the M second storage devices set a delete identifier corresponding to the target file for parity blocks corresponding to the target file when the M second storage devices determine that the M second storage devices do not store the target file.

16. The method according to claim 1, wherein:
the target file includes multiple files;
the target first storage devices respectively storing one or more of the multiple files, and the one or more files stored in each target first storage device are different; and
all the M second storage devices store the multiple files.

17. The method according to claim 1, wherein:
the preset condition includes a time threshold and a quantity threshold;
a timer starts when the target second storage device starts to operate; and
when determining that a quantity of files received and stored by the target second storage device reaches the quantity threshold before the timer reaches the time threshold, the target second storage device generates a parity block according to the files stored in the target second storage device.

18. The method according to claim 1, wherein:
the preset condition includes a quantity threshold; and
when determining that a quantity of files received and stored by the target second storage device reaches the quantity threshold, the target second storage device generates a parity block according to the files stored in the target second storage device.

19. The method according to claim 1, wherein:
the preset condition includes a time threshold; and
when determining that a time period that has lapsed since generation of a parity block last time reaches the time threshold, the target second storage device generates a parity block according to the files stored in the target second storage device.

20. The computer readable medium according to claim 11, wherein:
the preset condition includes at least one of a time threshold or a quantity threshold;
upon determining at least one of: a quantity of files received and stored by the target second storage device reaching the quantity threshold, or a time period that has lapsed since generation of a parity block last time reaches the time threshold, the target second storage device generates a parity block according to the files stored in the target second storage device.

* * * * *